United States Patent
Terashima

(10) Patent No.: US 6,219,096 B1
(45) Date of Patent: *Apr. 17, 2001

(54) IMAGE SIGNAL GENERATING AND CONVERTING DEVICE

(75) Inventor: Takashi Terashima, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/638,183

(22) Filed: Apr. 26, 1996

(30) Foreign Application Priority Data

Apr. 28, 1995 (JP) .................................... 7-127460

(51) Int. Cl.$^7$ ...................................... H04N 9/07
(52) U.S. Cl. ............................ 348/266; 348/223
(58) Field of Search .................. 348/266, 268, 348/267, 265, 262, 260, 222, 223, 228, 232, 233

(56) References Cited

U.S. PATENT DOCUMENTS

| | | | | |
|---|---|---|---|---|
| 3,971,065 | * | 7/1976 | Bayer | 348/276 |
| 4,891,690 | * | 1/1990 | Hasegawa | 358/514 |
| 4,985,758 | * | 1/1991 | Hashimoto | 348/321 |
| 5,018,017 | * | 5/1991 | Sasaki | 348/233 |
| 5,032,918 | * | 7/1991 | Ota et al. | 348/232 |
| 5,128,751 | * | 7/1992 | Ohara | 348/223 |
| 5,138,503 | * | 8/1992 | Nishida | 348/233 |
| 5,194,944 | * | 3/1993 | Uchiyama | 348/223 |
| 5,402,170 | | 3/1995 | Parulski et al. | |
| 5,434,629 | * | 7/1995 | Pearson et al. | 348/720 |
| 5,438,364 | * | 8/1995 | Maeshima | 348/223 |
| 5,475,441 | * | 12/1995 | Parulski et al. | 348/207 |
| 5,477,264 | * | 12/1995 | Sarbadhikari et al. | 348/231 |
| 5,493,335 | * | 2/1996 | Parulski | 348/233 |
| 5,506,617 | * | 4/1996 | Parulski et al. | 348/207 |
| 5,568,192 | * | 10/1996 | Hannah | 348/231 |
| 5,579,502 | * | 11/1996 | Konishi et al. | 395/430 |
| 5,640,202 | * | 6/1997 | Kondo | 348/222 |
| 5,644,359 | * | 7/1997 | Ito | 348/228 |
| 5,739,850 | * | 4/1998 | Hori | 348/231 |
| 5,787,240 | * | 7/1998 | Hansen et al. | 395/115 |

FOREIGN PATENT DOCUMENTS 0 308 075 A2    3/1989    (EP) .

OTHER PUBLICATIONS

IEEE Transactions on Consumer Electronics, "A Multimedia Color Camera Providing Multi–Format Digital Images", vol. 39, No. 3, Imaide et al., pp. 467–472, Aug. 1993.

Vision '89 Conference Proceedings, "Digital Output Cameras Enhance Image Processing Systems", A Prabhala, pp. 10.41–10.50, Jan. 1989.

* cited by examiner

Primary Examiner—Wendy R. Garber
Assistant Examiner—Aung S. Moe
(74) Attorney, Agent, or Firm—Sonnenschein, Nath & Rosenthal

(57) ABSTRACT

An image pick-up apparatus used by being connected to external equipment, a personal computer, with a simplified construction. The image pick-up apparatus is operated by the clock CK2 of the BUS for the external equipment, and output digital chrominance signals DR, DG and DB to the BUS.

4 Claims, 9 Drawing Sheets

COLOR FILTER 15R, 15G, 15B  ANALOG-TO-DIGITAL CONVERSION CIRCUIT

IMAGE SIGNAL GENERATING AND CONVERTING DEVICE

BACKGROUND OF THE INVENTION

1. Field of the Invention

The present invention relates generally to an image pickup apparatus. More particularly, the invention relates to an image pick-up apparatus used by being connected to external equipment, such as a personal computer or the like, which apparatus is operable by the clock of a bus for the external equipment so as to output digital chrominance signals to the bus, thereby simplifying the overall construction of the apparatus.

2. Description of the Related Art

Hitherto, personal computers, etc. are adapted to execute image processing by capturing video signals from video equipment, such as a television camera and so on, through an interface board used for video-signal processing.

Namely, FIG. 14 is a block diagram illustrating an image-processing system for use in a personal computer. In this image-processing system generally designated by 1, an interface board 2 used for video-signal processing is inserted into a slot of the personal computer and is connected to a bus of the personal computer. A television camera 3 is then connected to this interface board 2. The television camera 3 employed in this system outputs standard video signals according to the National Television System Committee (NTSC) system or the like. For example, the television camera 3 switches its operation under control of the personal computer through an interface, such as RS232C or the like, and outputs a video signal SV representing image pick-up results to a video terminal T1 of the interface board 2.

The interface board 2 inputs this video signal SV into a decoder 4 which then separates a horizontal synchronizing signal HD from the video signal SV with the use of its built-in synchronous separation circuit. The decoder 4 also divides the video signal SV into a luminance signal (Y signal) and a color difference signal (C signal) in its built-in Y/C separation circuit. Then, the decoder 4 further converts the luminance signal and the color difference signal into a red-color signal R, a green-color signal G and a blue-color signal B in a predetermined matrix computation circuit.

A phase locked loop (PLL) circuit 5 generates a clock CK1 having a predetermined frequency, based on the horizontal synchronizing signal HD that is output from the decoder 4, and then, outputs it. Analog-to-digital (A/D) conversion circuits 6R, 6G and 6B, relative to this clock CK1, digitize the red-color signal R, the green-color signal G and the blue-color signal B which are then respectively converted into 8-bit digital chrominance signals.

First In First Out (FIFO) storages 7R, 7G and 7B incorporate the digital chrominance signals that are output from the A/D conversion circuits 6R, 6B and 6B, respectively, at a timing in synchronization with the digital chrominance signals, and then output them to the internal BUS at a timing in synchronization with a clock CK2 of the BUS. With this arrangement, after the image-processing system of the above type thus converts the video signal SV obtained from a typical television camera into digital chrominance signals suitable for personal-computer processing, it outputs the signals to the personal computer at a timing in synchronization with the internal BUS.

In this type of image-processing system, it may be convenient and further increase ranges of uses for applications of personal computers of the above type if the overall construction of the image processing system is simplified.

SUMMARY OF THE INVENTION

In view of the above background, it is an object of the present invention to provide an image pick-up apparatus which is simply constructed on the whole and is able to output image pick-up results to external equipment, such as a personal computer and so on.

In order to solve the above problems, according to the present invention, there is provided an image pick-up apparatus comprising: an image pick-up device that sequentially samples images formed on its image pick-up surface and outputs image pick-up results; and analog-to-digital conversion means for converting the image pick-up results into digital chrominance signals of red, green and blue colors and outputting them to a bus for external equipment, wherein the image pick-up device sequentially samples the images at a timing in synchronization with the clock of the bus, and wherein the analog-to-digital conversion means generates the digital chrominance signals based on a timing in synchronization with the clock of the bus.

According to the present invention, there is also provided an image pick-up apparatus comprising: an image pick-up device that sequentially samples images formed on its image pick-up surface and outputs image pick-up results; and analog-to-digital conversion means for converting the image pick-up results into digital chrominance signals of red, green and blue colors and outputting them to a bus for external equipment, wherein the analog-to-digital conversion means generates the digital chrominance signals upon comparison with a reference voltage generated by a predetermined reference power supply, and varies the reference voltage so as to adjust the white balance of the digital chrominance signals.

Further, the foregoing image pick-up device may output the above-described image pick-up results at a horizontal scanning frequency and a vertical scanning frequency of a standard video signal.

Image pick-up results of the image pick-up device are converted into digital chrominance signals of red, green and blue colors, which are then output to the bus for external equipment. This makes it possible to eliminate a process for inversely converting a luminance signal and the like to a chrominance signal in external equipment or an interface for connecting the apparatus and the external equipment. Also, the image pick-up device sequentially samples image pick-up results at a timing in synchronization with the clock of the bus, and the analog-to-digital conversion means generates digital chrominance signals relative to a timing in synchronization with the clock of the bus. Accordingly, the digital chrominance signals can be directly output to the external bus.

Further, the analog-to-digital conversion means, which converts image pick-up results into digital chrominance signals of red, green and blue colors, generates the digital chrominance signals based on a comparison with a reference voltage generated by a predetermined reference supply, and also varies the reference voltage so as to adjust the white balance of the digital chrominance signals. This makes it possible to regulate the white balance during an analog-to-digital conversion operation without requiring adjustments of the level ratio of the chrominance signals.

In the above background, the foregoing image pick-up device outputs the above-described image pick-up results at a horizontal scanning frequency and a vertical scanning frequency of the standard video signal. This enables the use of integrated circuits and the like for processing standard video signals.

DESCRIPTION OF THE PREFERRED EMBODIMENT

A detailed description will now be given of an embodiment of the present invention with reference to the drawings.

Figure 1:
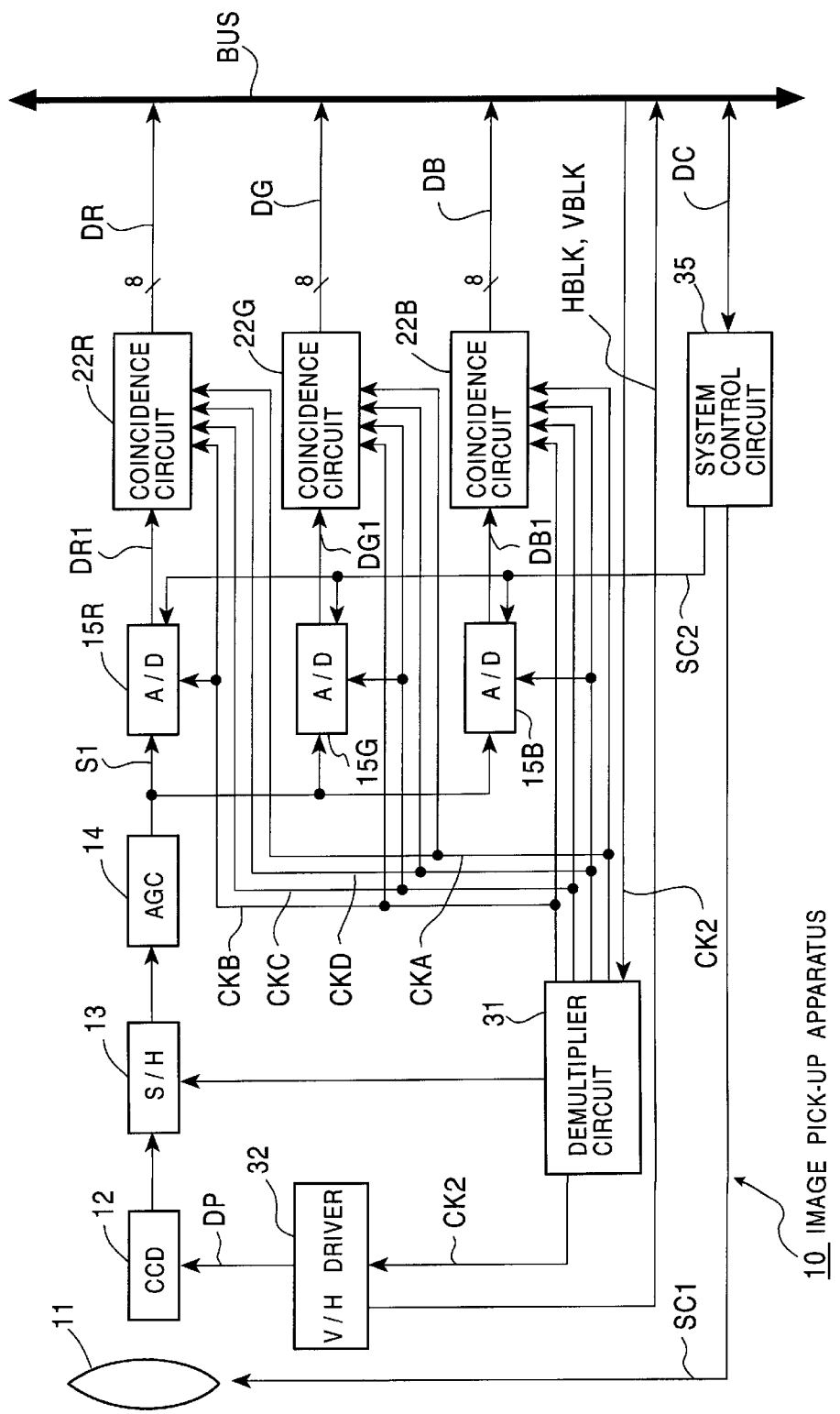
FIG. 1 is a block diagram of an image pick-up apparatus according to an embodiment of the present invention.

A reference will first be made to FIG. 1 to explain the construction of an embodiment of the present invention. FIG. 1 is a block diagram illustrating an image pick-up apparatus according to an embodiment of the present invention. This image pick-up apparatus 10 outputs image pick-up results to a personal computer by being directly connected to the internal BUS of the personal computer. More specifically, in the image pick-up apparatus 10, a lens 11, which can be formed to set the stop and the magnification under a control signal SC1, converges the incident light onto an image pick-up surface of a subsequent charge coupled device (CCD) solid-state image pick-up device 12. With this arrangement, the image pick-up apparatus 10 is formed to image a desired subject under desired conditions by varying the control signal SC1.

Figure 2:
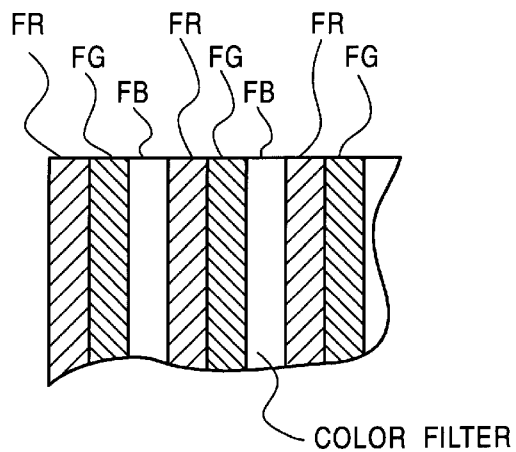
FIG. 2 is a schematic diagram of a color filter of the image pick-up device shown in FIG. 1.

The CCD solid-state image pick-up device 12, having a predetermined color filter on its image pick-up surface, sequentially outputs, relative to a predetermined drive pulse DP, accumulated charges of the respective pixels forming the image pick-up surface in the order of raster scanning. As shown in FIG. 2, the color filter provided for the device 12 is a striped color filter which is formed by a cyclic repetition of red, green and blue color filters PR, FG and FB in the horizontal direction. This enables the image pick-up device 12 to output an image pick-up signal indicating a cyclic repetition of the image pick-up results of the respective red, green and blue colors.

A sample-and-hold circuit (S/H) 13 processes, based on a predetermined sample-and-hold pulse, the image pick-up signal of the image pick-up device 12 according to a correlated double sampling technique, thereby outputting a chrominance signal representing a cyclic repetition of red-color signals, green-color signals and blue-color signals. An automatic gain control (AGC) circuit 14 amplifies the chrominance signal that is sent from the sample-and-hold circuit 13 and outputs the resulting signal. During this operation, the AGC circuit 14 varies the gain according to the level of the chrominance signal so as to correct the level of the signal and output it.

Figure 3:
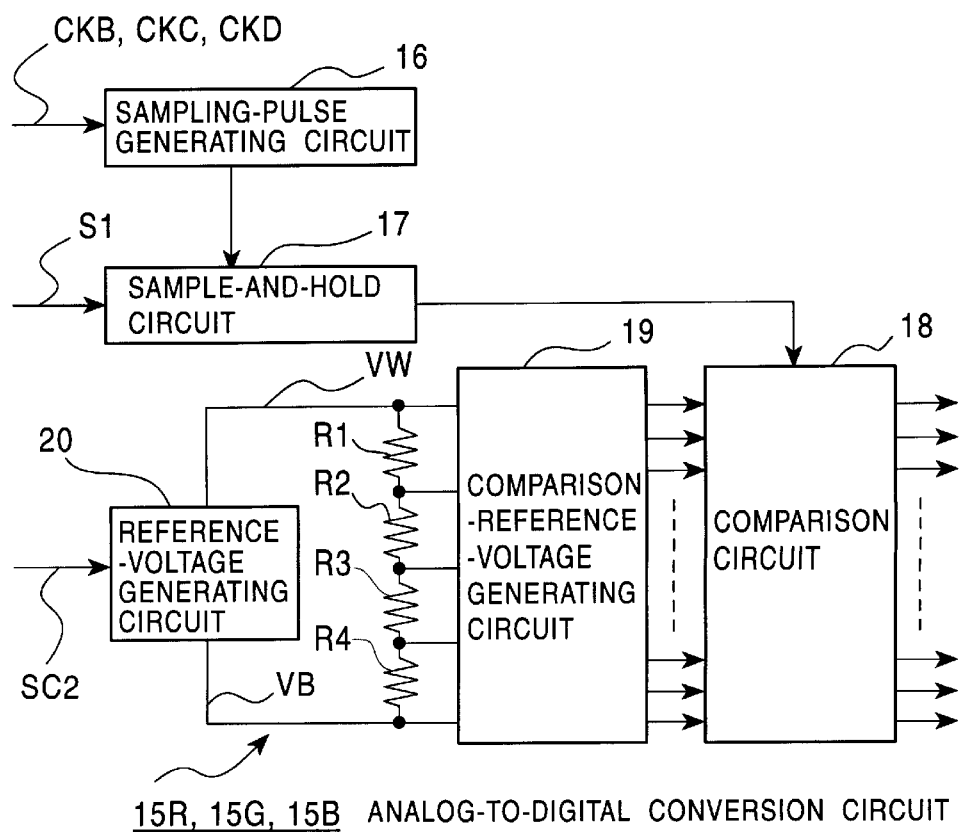
FIG. 3 is a block diagram of the analog-to-digital conversion circuit shown in FIG. 1

Analog-to-digital (A/D) conversion circuits 15R, 15G and 15B sequentially convert an analog output signal S1 of the AGC circuit 14 into a digital signal in a cyclic manner, relative to predetermined clocks CKA to CKC, respectively. Accordingly, the A/D conversion circuits 15R, 15G and 15B separate a red-color signal, a green-color signal and a blue-color signal from this output signal S1, and also converts them into digital chrominance signals DR1, DG1 and DB1, respectively, so as to output them. The respective A/D conversion circuits 15R, 15G and 15B are constructed as shown in FIG. 3 in order to satisfy the above-described functions. More specifically, a sampling-pulse generating circuit 16 generates a sample-and-hold pulse based on the predetermined clocks CKB, CKC and CKD. A sample-and-hold circuit (S/H) 17 samples and holds, based on this sample-and-hold pulse, an output signal S1 at timings corresponding to the red-color signal, the green-color signal and the blue-color signal.

A comparison circuit 18 in a subsequent stage compares the results obtained by the sample-and-hold circuit 17 and a plurality of comparison reference voltages that are output from a comparison-reference-voltage generating circuit 19 and obtains the comparison results. Based on the comparison results, the respective A/D conversion circuits 15R, 15G and 15B generate 8-bit digital signals in a decoder in a subsequent stage. In this fashion, after the A/D conversion circuits 15R, 15G and 15B separate the corresponding chrominance signals from the output signal S1 of the AGC circuit 14, they convert the signals into the digital chrominance signals DR1, DG1 and DB1 and output them.

The comparison-reference-voltage generating circuit 19 divides, by the use of its built-in voltage-dividing circuit, reference voltages VB and VW used for setting the black level and the white balance, respectively, that are output from a reference-voltage generating circuit 20, and generates a plurality of comparison reference voltages. By using a built-in constant-voltage circuit, the reference-voltage generating circuit 20 generates the black-level setting reference voltage VB and the white-balance setting reference voltage VW. During this operation, the reference-voltage generating circuit 20 varies the white-balance reference voltage VW according to the control signal SC2.

Figure 4:
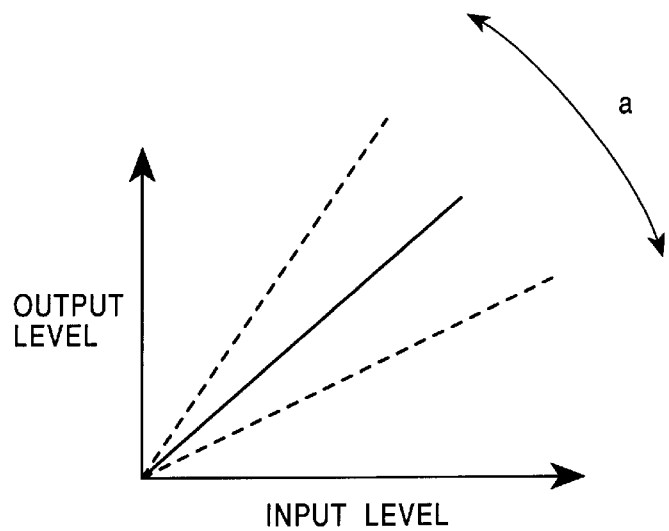
FIG. 4 is a diagram illustrating input/output characteristics of the analog-to-digital conversion circuit shown in FIG. 3
Figure 5:
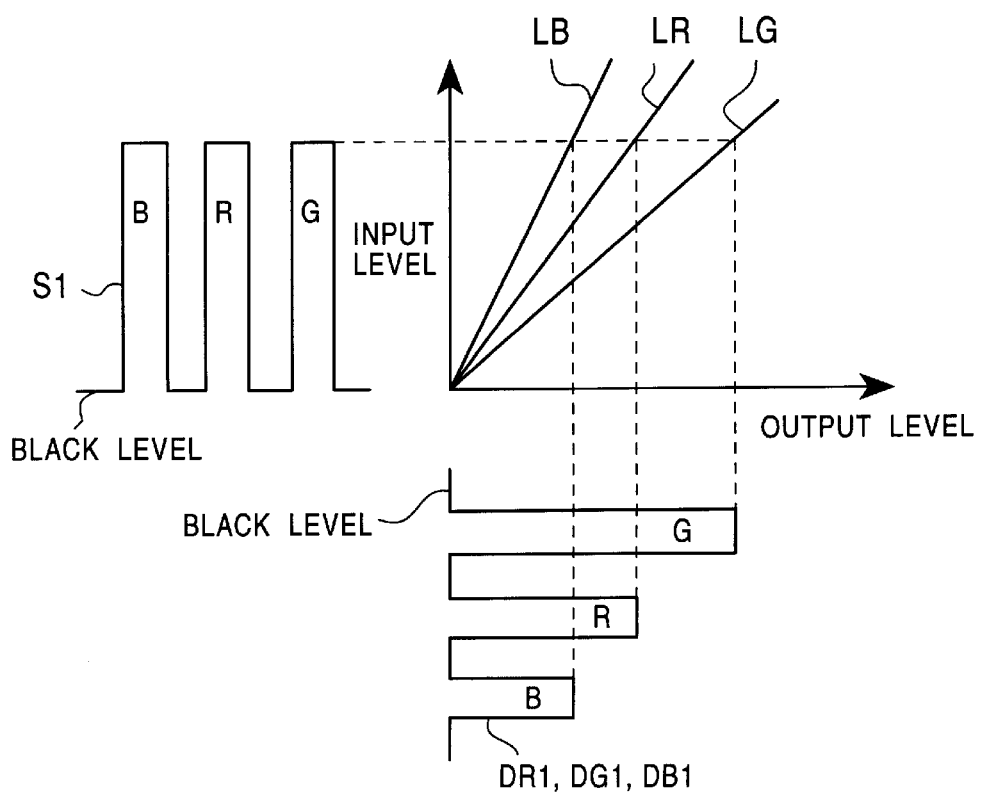
FIG. 5 is a schematic diagram illustrating white-balance adjustments performed by the analog-to-digital conversion circuit shown in FIG. 3

In this manner, the A/D conversion circuits 15R, 15G and 15B are adequate to vary the potential difference between a plurality of comparison reference voltages to be input into the comparison circuit 18, by the use of the control signal S2, so that they can adjust input/output characteristics as desired, as indicated by the arrow a in FIG. 4. As input/ output characteristics of the A/D conversion circuits 15R, 15G and 15B are shown as indicated by straight lines LR, LG and LB in FIG. 5, the image pick-up apparatus 10 adjusts the input/output characteristics of the A/D conversion circuits 15R, 15G and 15B so as to freely regulate the level ratio of the digital chrominance signals DR1, DG1 and DB1, whereby the white balance can be adjusted. As has been discussed above, the image pick-up apparatus 10 is capable of regulating the white balance simply by the use of the built-in A/D conversion circuits 15R, 15G and 15B. As a result, the overall construction of the apparatus can be simplified.

Figure 6:
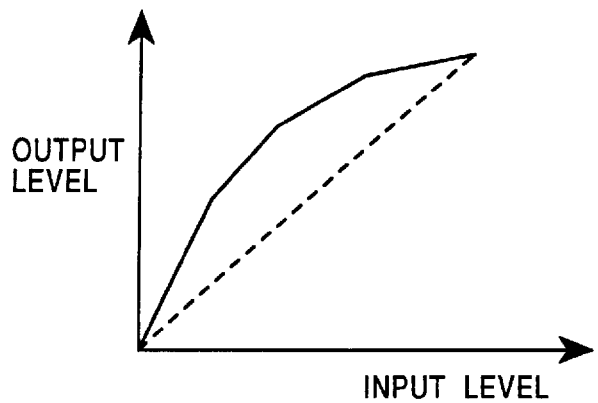
FIG. 6 is a diagram illustrating gamma corrections made by the analog-to-digital conversion circuit shown in FIG. 3

Moreover, the A/D conversion circuits 15R, 15G and 15B, formed of integrated circuits, are adapted to vary the voltage-dividing ratio of the comparison-reference-voltage generating circuit 19 by connecting external resistors between prescribed terminals of the circuits. In this embodiment shown in FIG. 3, the A/D conversion circuits 15R, 15G and 15B, connected through the use of resistors R1 to R4 between their terminals, are set so that the potential difference between the comparison reference voltages can become progressively smaller toward the black level. With this setting condition, the A/D conversion circuits 15R, 15G and 15B approximate the input/output characteristics by use of a line graph and make gamma corrections, as illustrated in FIG. 6.

Figure 7A:
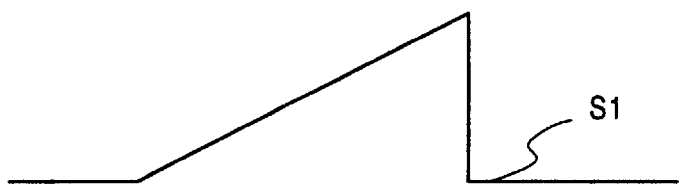
FIG. 7, which is comprised of FIGS. 7A and 7B, is a diagram of a signal waveform illustrating the gamma corrections shown in FIG. 6.
Figure 7B:
Figure 8:
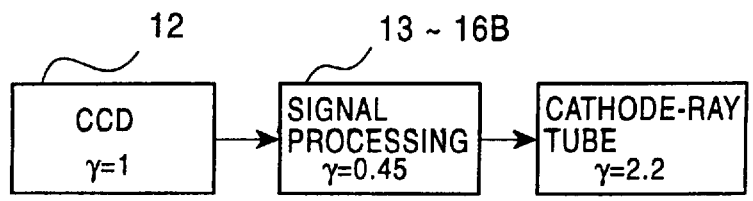
FIG. 8 is a block diagram illustrating the gamma corrections shown in FIG. 7.

With this operation, the image pick-up apparatus 10 is set so that the level of a digital video chrominance signal can be varied with gamma 0.45 (FIG. 7B), for example, when the level of the chrominance signal changes in the form of a saw-tooth wave (FIG. 7A). With the CCD solid-state image pick-up device 12 having gamma 1 and a cathode-ray tube having gamma 2.2, as illustrated in FIG. 8, the image pick-up apparatus 10 is set so that the overall gamma characteristics can be value 1. Accordingly, the image pick-up apparatus 10 is able to make gamma corrections by use of its built-in A/D conversion circuits 15R, 15G and 15B, whereby the overall construction of the apparatus can further be simplified.

Figure 9A:
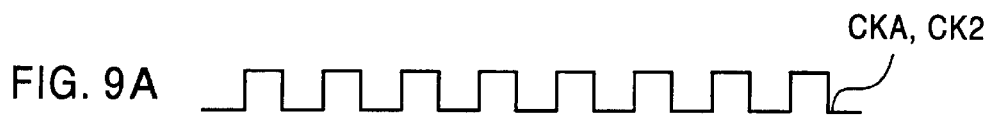
FIG. 9, which is comprised of FIGS. 9A to 9H, is a waveform diagram illustrating the operation of coincidence circuits.
Figure 9B:
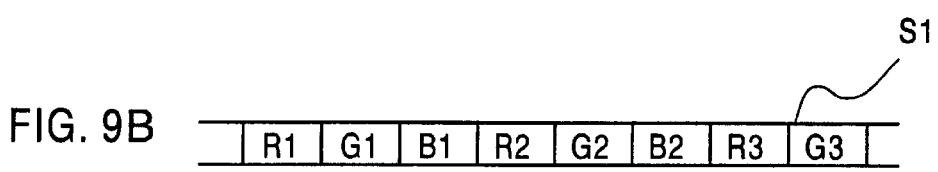
Figure 9C:
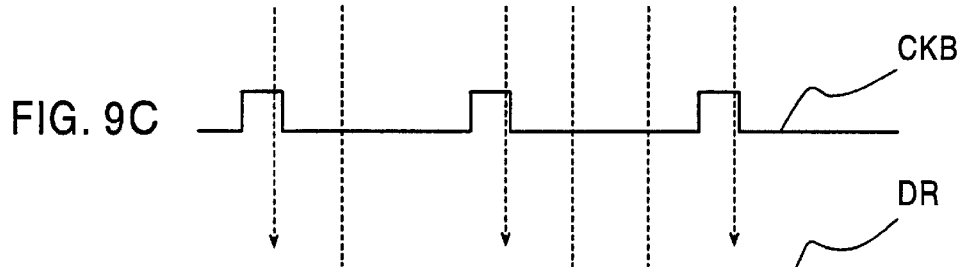
Figure 9D:
Figure 9E:
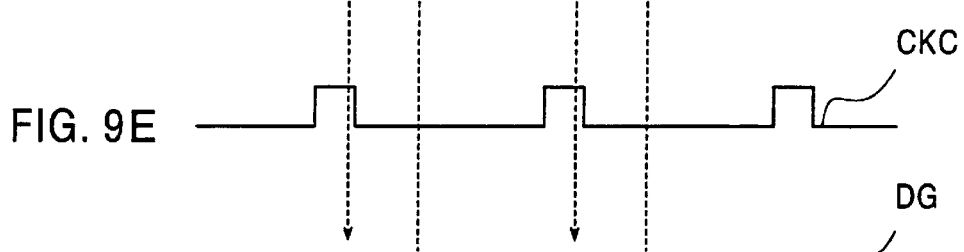
Figure 9F:
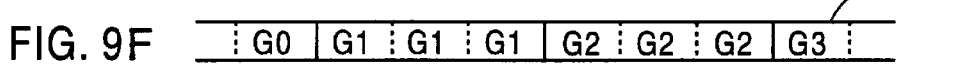
Figure 9G:
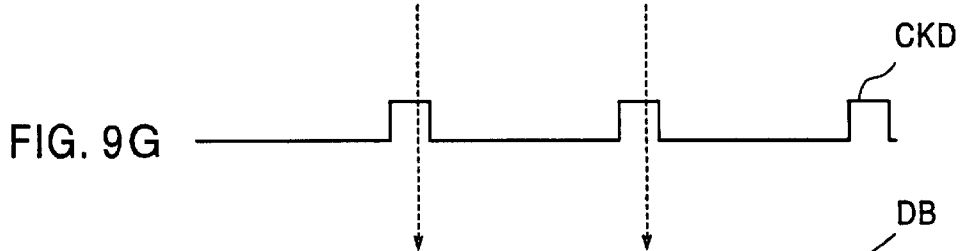

Coincidence circuits 22R, 22G and 22B shown in FIG. 1 are configured to switch the signal level in a cycle corresponding to three pixels and at a timing associated with the arrangement of the pixels forming the CCD solid-state image pick-up device 12. With this configuration, the coincidence circuits 22R, 22G and 22B execute coincidence-processing on digital chrominance signals DR1, DG1 and DB1 and output the resulting digital chrominance signals DR, DG and DB, respectively. More specifically, as shown in FIG. 9, in this embodiment, a striped-color filter is formed on the image pick-up surface to obtain the image pick-up results. Accordingly, red-color signals, green-color signals and blue-color signals are cyclically repeated in the chrominance signal S1 that is input into the A/D conversion circuits 15R, 15G and 15B (FIG. 9B), as indicated by the symbols R, G and B followed by numerics. In the A/D conversion circuit 15R corresponding to red-color signals, red-color signals R are separated based on the corresponding clock CKB and are converted into the digital chrominance signal DR1 (FIG. 9D). Similarly, in the A/D conversion circuits 15G and 15B associated with green-color signals and blue-color signals, respectively, green-color signals G and blue-color signals B are separated based on the corresponding clocks CKC and CKD, respectively, and are converted into digital chrominance signals DG1 and DB1, respectively (FIGS. 9E and 9G).

Figure 10:
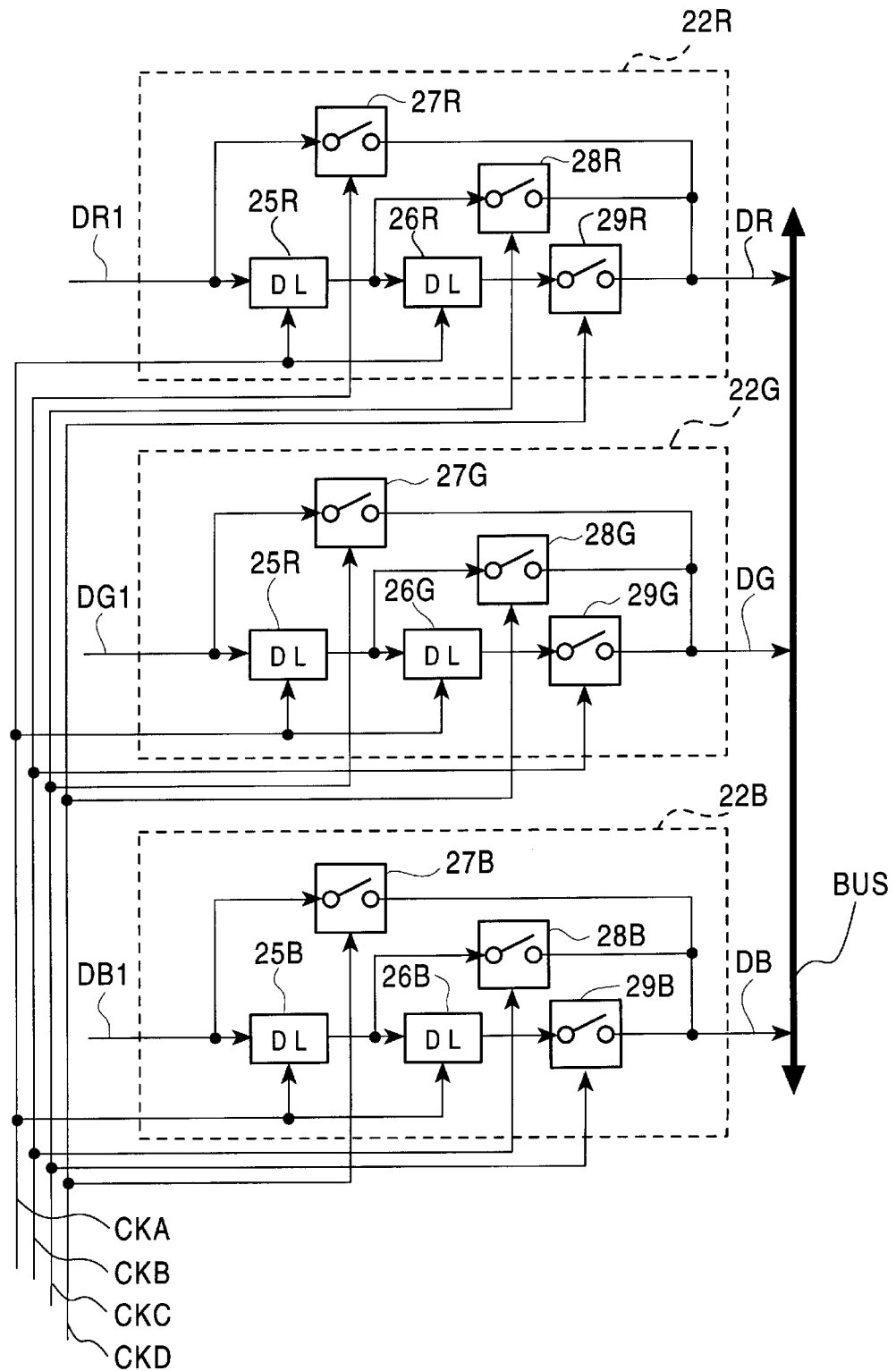
FIG. 10 is a block diagram of the coincidence circuits shown in FIG. 1.

As shown in FIG. 10, by the use of a latch circuit, the coincidence circuits 22R, 22G and 22B form a pair of one-clock delay circuits (D) 25R and 26R, 25G and 26G, and 25B and 26B, respectively, each pair of delay circuits being connected in series to each other, whereby digital chrominance signals DR1, DG1 and DB1 are input into the respective series circuits. The one-clock delay circuits 25R to 26B are operable by the clock CKA in synchronization with the chrominance signal S1 (FIG. 9A). This causes each of the coincidence circuits 22R, 22G and 22B, corresponding to the period of forming a color filter, to hold a corresponding input digital chrominance signal for one pixel during a period of two clocks until a subsequent corresponding digital chrominance signal for one pixel is input.

Figure 9H:
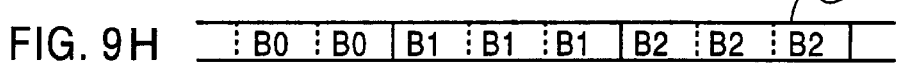

The coincidence circuits 22R, 22G and 22B comprise first switch circuits 27R, 27G and 27B that directly output input digital chrominance signals, respectively, second switch circuits 28R, 28G and 28B that output digital chrominance signals delayed by a period of one clock by the one-clock delay circuits 25R, 25G and 25B, respectively, and third switch circuits 29R, 29G and 29B that output digital chrominance signals delayed by a period of two clocks by the series circuits formed by the pairs of delay circuits 25R and 26R, 25G and 26G, and 25B and 26B, respectively. These first to third switch circuits 27R to 29B are cyclically switched to the on state in correspondence with the digital chrominance signals DR1, DG1 and DB1, respectively. More specifically, when the corresponding chrominance signals for one pixel are input, the coincidence circuits 22R, 22G and 22B switch the first switch circuits 27R, 27G and 27B, respectively, to the on state so as to output the digital chrominance signals for one pixel. In a subsequent clock period, the coincidence circuits 22R, 22G and 22B switch the second switch circuits 28R, 28G and 28B, respectively, to the on state. This makes it possible to hold the digital chrominance signals DR, DG and DB output from the coincidence circuits 22R, 22G and 22B, respectively, at the same signal level as those prior to one clock period. In a further subsequent clock period, the coincidence circuits 22R, 22G and 22B switch the third switch circuits 29R, 29G and 29B, respectively, to the on state, and then, in a yet subsequent clock period, the first switch circuits 27R, 27G and 27B are once again switched. Because of the above switching operations, the digital chrominance signals DR, DG and DB can be held at the corresponding signal levels during the consecutive three clock periods (FIGS. 9D, 9F and 9H).

With the above arrangement, the coincidence circuits 22R, 22G and 22B output the digital chrominance signals DR, DG and DB in such a manner that the signal level can be switched in a cycle corresponding to three pixels and at a timing associated with the arrangement of the pixels of the CCD solid-state image pick-up device 12.

In this manner, in the image pick-up apparatus 10, a color filter is formed by the arrangement of red-color, green-color and blue-color filters in the form of a strip. The image pick-up results are sequentially separated and subjected to digital processing at a timing corresponding to the arrangement of the color filter. This makes it possible to obtain digital chrominance signals DR, DG and DB, by a simple construction, whose signal levels can be switched at a timing corresponding to the arrangement of the pixels forming the image pick-up device 12. The overall construction of the apparatus can thus be further simplified.

Even though the digital chrominance signals DR, DG and DB are output so that the signal levels can be switched in a cycle of three pixels, the digital chrominance signals DR, DG and DB each have spatial position information on the consecutive pixels by changing the signal level at a timing associated with the arrangement of the pixels. In this embodiment, it is thus possible to ensure the horizontal resolution of a luminance signal to such a degree as to a frequency about one half of the frequency of the clock CKA (i.e. the clock for sampling the pixels forming the CCD solid-state image pick-up device 12) in synchronization with the above-described chrominance signal S1. In contrast, it is possible to guarantee the resolution of a chroma signal to such a degree as to a frequency about one third of the frequency of the clock CKA, since the color filter is formed in a cycle of three pixels.

The coincidence circuits 22R, 22G and 22B (FIG. 1) directly output the digital chrominance signals DR, DG and DB generated as described above to the BUS of a personal computer. This can eliminate the need for a signal-processing circuit, such as the decoder 4, required for conventional image-processing system 1 in the personal computer. As a result, the overall construction of the image pick-up apparatus can be simplified.

In response to the above construction, a frequency demultiplier circuit 31 shown in FIG. 1 receives the bus clock CK2 from the BUS and outputs it to a vertical-horizontal driver 32. The V/H driver 32 generates, based on this bus clock CK2, a drive pulse DP of the CCD solid-state image pick-up device 12 so as to drive the image pick-up device 12 at a timing in synchronization with the bus clock CK2. In this embodiment, it is thus possible to generate from the image pick-up device 12 an image pick-up signal representing a cyclic repetition of red-color, green-color and blue-color image pick-up results in synchronization with the bus clock CK2. The frequency demultiplier circuit 31 further generates a sample-and-hold pulse of the sample-and-hold circuit 13 based on the bus clock CK2. This also makes it possible to, in this embodiment, generate a chrominance signal S1 indicating a cyclic repetition of red-color, green-color and blue-color signals in synchronization with the bus clock CK2. Additionally, by use of the clock CKA in phase with the bus clock CK2 in a synchronizing manner, the frequency demultiplier circuit 31 drives the one-clock delay circuits 25R to 26B of the coincidence circuits 22R, 22G and 22B. The frequency demultiplier circuit 31 also demultiplies the bus clock CK2 to one third so as to generate the first to third clocks CKB to CKD causing the signal level to rise in a cyclic manner. The frequency demultiplier circuit 31 drives the A/D conversion circuits 15R to 15B and the coincidence circuits 22R to 22B using the first to third clocks CKB to CKD, respectively.

Figure 14:
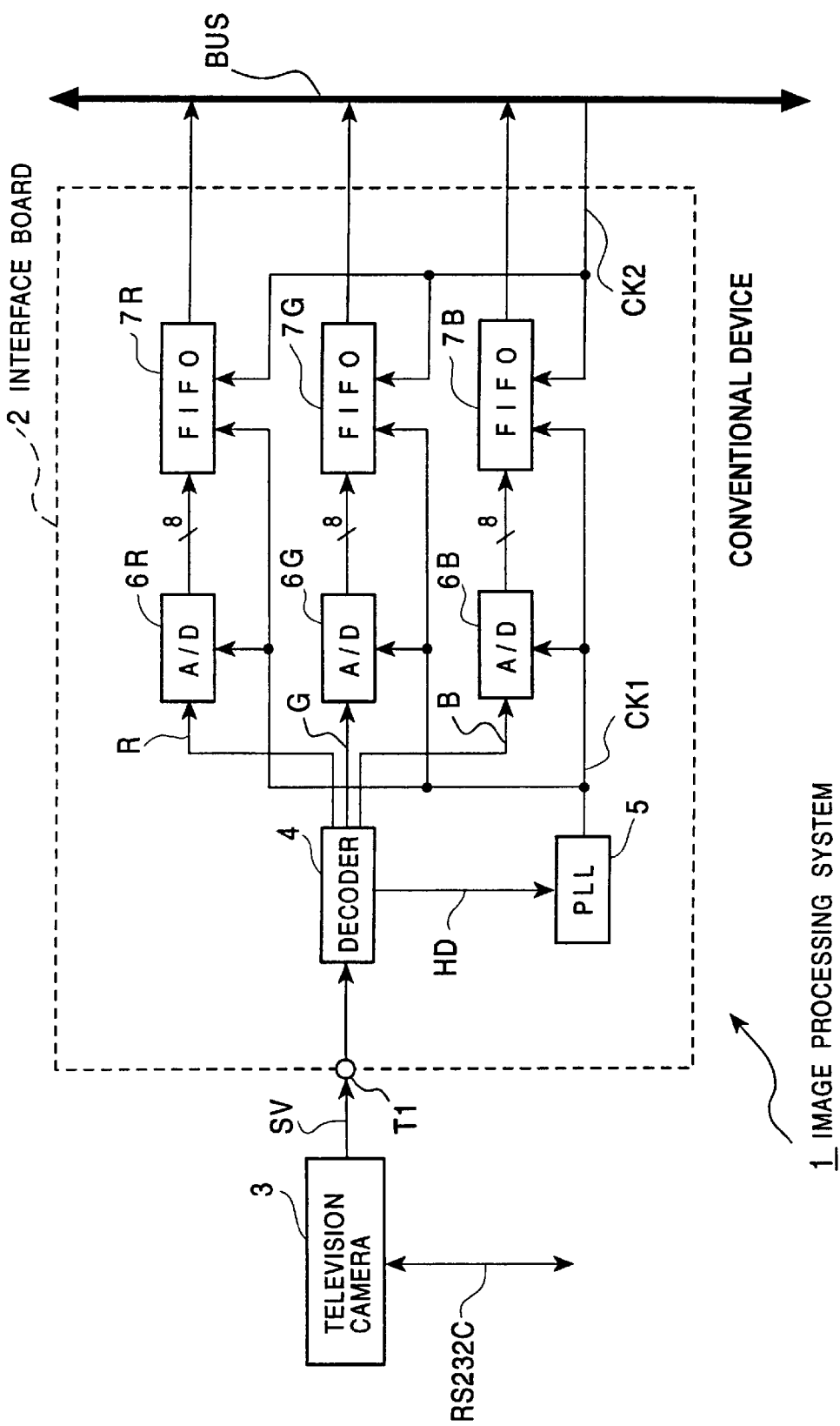
FIG. 14 is a block diagram illustrating a conventional image-processing system.

The image pick-up apparatus 10 is thus configured to be operable, by and large, by the bus clock CK2 so that it can directly output digital chrominance signals DR, DG and DB to the BUS from the coincidence circuits 22R, 22G and 22B and incorporate them to a personal computer. Hence, FIFO storages described above, as shown in FIG. 14, can be omitted in the image pick-up apparatus 10. This further simplifies the image pick-up apparatus 10. Additionally, since the overall apparatus 10 is operable by the bus clock CK2, it is possible to obviate the provision of extra circuits specifically used for generating the clock. Because of this, the overall apparatus 10 can further be downsized. It should be noted that the frequency demultiplier circuit 31 also generates the clock of a system control circuit 35 based on this bus clock CK2.

For generating the drive pulse DP of the CCD solid-state image pick-up device 12 relative to the bus clock CK2, the V/H driver 32 drives the image pick-up device 12 based on the horizontal scanning frequency and the vertical scanning frequency of a video signal according to the NTSC system, which is one of the standard video signals. Namely, the V/H driver 32 counts the bus clock CK2 by use of its built-in counter so as to generate a horizontal blanking pulse HBLK, a vertical blanking pulse VBLK, a field pulse and so on. The reset value of the counter has been determined corresponding to the frequency of the bus clock CK2 of a bus to be connected to the image pick-up apparatus 10.

Figure 11A:
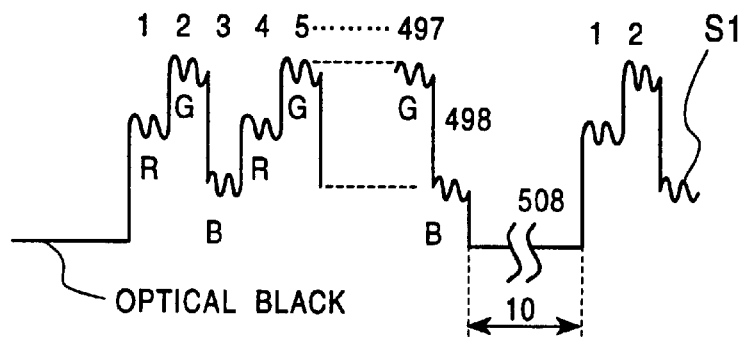
FIG. 11, which is comprised of FIGS. 11A and 11B, is a diagram of a signal waveform illustrating the horizontal scanning operation performed by the image pick-up apparatus shown in FIG. 1.
Figure 11B:
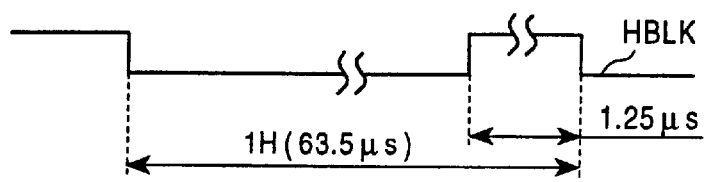

More specifically, if the image pick-up apparatus 10 is operable by the bus clock CK2 having a frequency of 8 [MHz], the CCD solid-state image pick-up device 12 sequentially outputs accumulated charges in a cycle of 0.125 [μs]. In contrast, one horizontal scanning period according to the NTSC system is 63.5 [μs]. In view of this background, as shown in FIG. 11, the bus clock CK2 for 508 pixels is allocated to one horizontal period so as to set the frequency of the CCD solid-state image pick-up device 12 to that of the video signal of the NTSC system (FIGS. 11A and 11B).

After the V/H driver 32 causes the signal level of the horizontal blanking pulse HBLK to fall, it counts 498 pulses of the bus clock CK2, and then further causes the signal level of the horizontal blanking pulse HBLK to rise, followed by counting 10 pulses of the bus clock CK2. The V/H driver 32 once again allows the signal level of the horizontal blanking pulse HBLK to fall, thus counting one horizontal scanning period (1H).

Figure 12:
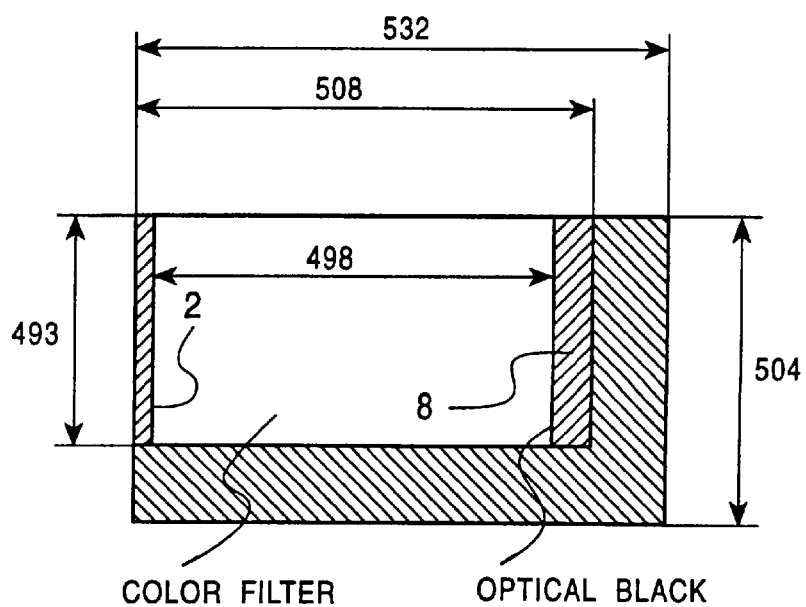
FIG. 12 is a schematic diagram of the image pick-up surface of the image pick-up device shown in FIG. 1.

As shown in FIG. 12, the CCD solid-state image pick-up device 12 responds to the counting operation of the V/H driver 32 in the following manner. That is, in a 532×504-pixel image pick-up device applied to a television camera of the NTSC system, two pixels from the starting edge of the horizontal scanning operation are allotted to an optical black zone; subsequent 498 pixels are allocated to a color filter; and further subsequent 8 pixels are allotted to an optical black zone. In regard to the vertical scanning direction, since the video signal of the NTSC system is formed of 525 lines, each line consisting of 63.5 [μs], one frame is formed of 33.3 [ms]. Accordingly, the V/H driver 32 counts the bus clock CK2 based on the horizontal blanking pulse HBLK, thereby driving the CCD solid-state image pick-up device 12 by the same number of lines as a television camera of the NTSC system.

Figure 13A:
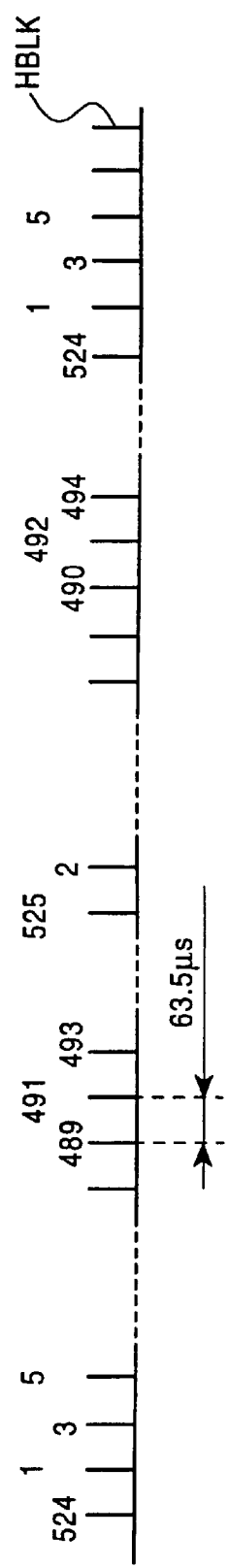
FIG. 13, which is comprised of FIGS. 13A to 13C, is a diagram of a signal waveform illustrating the vertical scanning operation performed by the image pick-up apparatus shown in FIG. 1.
Figure 13B:
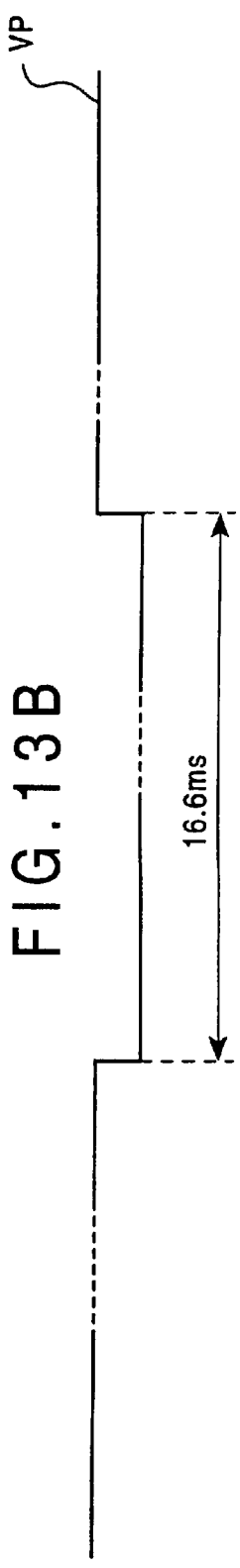
Figure 13C:
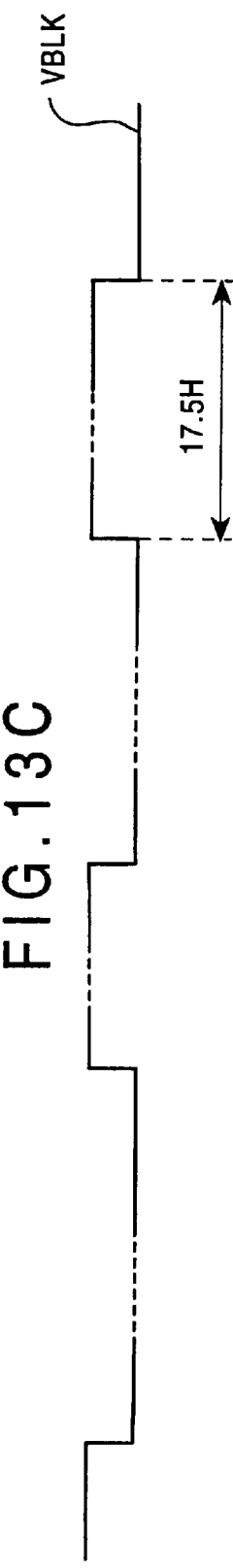

More specifically, as illustrated in FIG. 13, the V/H driver 32 generates a field pulse VP (FIG. 13B) relative to the horizontal blanking pulse HBLK (FIG. 13A) so that the signal level is caused to fall at a timing between the 491 line and the 493 line and to rise at a timing corresponding to the 492 line. Similarly, the V/H driver 32 generates the vertical blanking pulse VBLK (FIG. 13C). With this operation, the image pick-up apparatus 10 varies the aspect ratio of the digital chrominance signals DR, DG and DB from that of the standard video signal so that it can drive the image pick-up device 12 by the use of the horizontal scanning frequency and the vertical scanning frequency substantially equal to those of the standard video signal. This configuration makes it possible to form the image pick-up apparatus 10 by CCD-driving integrated circuits and so on for use in ordinary television cameras. As a consequence, the overall construction of the apparatus 10 can be simplified. Further, the V/H driver 32 outputs the horizontal blanking pulse HBLK and the vertical blanking pulse VBLK as control signals to the BUS, whereby the personal computer is able to detect the horizontal blanking period and the vertical blanking period based on the control signals.

The system control circuit 35, formed of a microcomputer controlling the overall operation of the image pick-up apparatus 10, captures data DC that has been sent to the BUS from the personal computer and analyzes it during the vertical blanking period. The system control circuit 35 further issues, upon the results of the analysis, a response command to the BUS as required during the vertical blanking period and subsequently inputs a control command DC output from the personal computer. In this fashion, the system control circuit 35 sends and receives various types of data to and from a personal computer by effectively using a vertical blanking period which is not employed for transmitting the digital chrominance signals DR, DG and DB.

When a prescribed control command is input from the BUS, the system control circuit 35 outputs the control signal SC1 to the lens 11 and, in response to this control command, controls the magnification, the stop, etc., of the lens 11. In a similar manner, the system control circuit 35 outputs the control signal SC2 to the A/D conversion circuits 15R, 15G and 15B so as to vary the white-balance-adjusting reference voltage VW. The image pick-up apparatus 10 therefore allows a personal computer to control the operation through the BUS which is employed for transmitting the digital chrominance signals by making the best use of the vertical blanking period. It is thus possible to eliminate the need for an interface specifically used for the above control operation, such as RS232C, as is conventionally required. This makes it possible to simplify the overall construction of the apparatus 10.

The operation of the image pick-up apparatus 10 constructed as described above will now be explained. The system control circuit 35 variously controls the stop and magnification of the lens 11 in response to the control command sent to the BUS during the vertical blanking period, whereby light incident on the lens 11 is converged onto the image pick-up surface of the CCD solid-state image pick-up device 12 and subjected to photoelectric conversion under the conditions specified by a personal computer. The image pickup results subjected to photoelectric conversion are output as an image pick-up signal representing a cyclic repetition of red-color, green-color and blue-color image pick-up results through the use of a color filter (FIG. 2) formed on the image pick-up surface. The red-color, green-color and blue-color image pick-up results are output in a cyclic manner at a timing in synchronization with the bus clock CK2. The image pick-up results are also output at a horizontal scanning frequency and a vertical scanning frequency substantially equal to those of the video signal of the NTSC system at the aspect ratio different from the video signal of the NTSC system and at a timing in synchronization with the bus clock CK2.

This image pick-up signal is sampled and held, relative to the bus clock CK2, in the sample-and-hold circuit 13 in a subsequent stage, whereby it can be converted into the chrominance signal S1 indicating a cyclic repetition of red-color, green-color and blue-color signals, in synchronization with the bus clock CK2. The signal level of the chrominance signal S1 is corrected in the AGC circuit 14 in a subsequent stage. Subsequently, the chrominance signal S1 is sampled and held in a cyclic manner in the A/D conversion circuits 15R, 15G and 15B in the order of a red-color signal, a green-color signal and a blue-color signal. The chrominance signal S1 is thus separated into the respective colors of signals, which are then subjected to analog-to-digital conversion and output. At this time, the system control circuit 35 variably controls the white-balance setting reference voltage VW in response to the control command sent to the BUS, during the vertical blanking period. This makes it possible to set the respective colors of signals to the signal level ratios specified by a personal computer, and thus to make adjustments to the white balance. Also, by use of external resistors R1 to R4, the input/output characteristics of the A/D conversion circuits 15R, 15G and 15B are approximated with a line graph so as to undergo gamma corrections, and then, the digital chrominance signals are output.

The digital chrominance signals DR1, DG1 and DB1 output from the A/D conversion circuits 15R, 15G and 15B, respectively, are sequentially transferred through the corresponding delay circuits 25R to 26B of the coincidence circuits 22R, 22G and 22B in a subsequent stage during a period from when a corresponding digital chrominance signal for one pixel is input until when a subsequent corresponding signal for one pixel is input. Moreover, the switch circuits 27R to 29B are sequentially changed to the on-state in a cyclic manner (FIG. 10), whereby the digital chrominance signals DR, DG and DB are generated so that the signal level can be switched in a cycle associated with three pixels and at a timing corresponding to the arrangement of the pixels forming the image pick-up device 12. The digital chrominance signals DR, DG and DB are then directly output to the BUS. As a consequence, the image pick-up results of the image pick-up apparatus 10 are directly output, at a timing in synchronization with the bus clock CK2, to the BUS in the form of the digital chrominance signals DR, DG and DB suitable for image processing through the use of a computer.

The image pick-up apparatus constructed as discussed above of this embodiment offers the following advantages. When the apparatus 10 is operated based on the bus clock CK2, it converts image pick-up results of the CCD solid-state image pick-up device 12 into red-color, green-color and blue-color digital signals and directly outputs them to the BUS. This makes it possible to obviate interfaces, such as FIFO storage, a decoder, etc., and a signal-processing circuit. The overall construction of the apparatus can thus be simplified. Also, in the analog-to-digital conversion circuits, red-color signals, green-color signals and blue-color signals are separated from a chrominance signal formed of a cyclic repetition of the respective colors of signals and are converted into digital chrominance signals. As well as this operation, gamma corrections and white-balance adjustments are made in the analog-to-digital conversion circuits. This further simplifies the overall image pick-up apparatus. Further, the CCD solid-state image pick-up device is driven at a horizontal scanning frequency and a vertical scanning frequency equal to those of the video signal of the NTSC system. This makes it possible to form the CCD solid-state image pick-up device by various integrated circuits applied to television cameras, etc. of the NTSC system. Hence, the overall construction of the apparatus can be simplified.

The foregoing embodiment has been discussed in which a red-color, green-color and blue-color striped filter is disposed on the image pick-up surface. This is not, however, exclusive, and instead, what is referred to as "a complementary-color striped filter" may be provided. Moreover, although the foregoing embodiment has been explained in which the present invention is applied to a single-chip image pick-up apparatus, it is also applicable to a three-chip image pick-up apparatus and so on, in which case, coincidence circuits may be omitted.

In the foregoing embodiment, gamma corrections and white-balance adjustments are also made by analog-to-digital conversion circuits. This is not, however, exclusive, and a circuit specifically used for gamma corrections and white-balance adjustments may be formed independently of the analog-to-digital conversion circuits. Further, the foregoing embodiment has been described in which in an image pick-up apparatus directly connected to the internal BUS of a personal computer, white-balance adjustments are made in the analog-to-digital conversion circuits. The present invention is not restricted to this construction, and it is applicable to various types of image pick-up apparatuses, such as general television cameras and so on.

Additionally, in the foregoing embodiment, image pick-up results are output at a horizontal scanning frequency and a vertical scanning frequency corresponding to the standard video signal of the NTSC system. This is not, however, exclusive, and instead, image pick-up results may be output at a horizontal scanning frequency and a vertical scanning frequency associated with the standard video signal of a phase alternation by line (PAL) system or the like. In such a case, image pick-up results may be output according to the interlace scanning method, and also may be output at a horizontal scanning frequency and a vertical scanning frequency designated by a personal computer.

As will be clearly understood from the foregoing description, the present invention offers the following advantages. Image pick-up results of an image pick-up device are converted into digital chrominance signals of red, green and blue colors and are output to the bus for external equipment. In this manner, the image pick-up results are sequentially sampled at a timing in synchronization with the clock of the bus, and digital chrominance signals are generated. Accordingly, the image pick-up results can be directly output to the bus. This enables the overall construction of the image pick-up apparatus to be simplified.

What is claimed is:

1. An image pick-up apparatus comprising:
   an image pick-up device that samples images and outputs image pick-up results; and
   analog-to-digital conversion means for converting said image pick-up results into digital chrominance signals of red, green and blue colors and outputs them to a bus connected to external equipment,
   wherein said image pick-up device samples said images in synchronization with a clock of said bus, and wherein said analog-to-digital conversion means generates said digital chrominance signals in synchronization with the clock of said bus.

2. An image pick-up apparatus comprising:
   an image pick-up device that samples images and outputs image pick-up results; and
   analog-to-digital conversion means for converting image pick-up results into digital chrominance signals of red, green and blue colors and outputs them to a bus connected to external equipment, wherein said analog-to-digital conversion means generates said digital chrominance signals with respect to a reference voltage generated by a reference power supply in synchronization with the clock of the bus, and varies said reference voltage so as to adjust a white balance of said digital chrominance signals.

3. An image pick-up apparatus according to claim 1, wherein said analog-to-digital conversion means generates said digital chrominance signals with respect to a reference voltage generated by a reference power supply and varies said reference voltage so as to adjust the white balance of said digital chrominance signals.

4. An image pick-up apparatus according to claim 1, wherein said image pick-up device outputs said image pick-up results at a horizontal scanning frequency and vertical scanning frequency of a standard video signal.

* * * * *